Dec. 27, 1966  C. P. COUGHLAN  3,294,157
REVERSE CYCLE HEAT PUMP
Filed July 21, 1964  3 Sheets-Sheet 1

INVENTOR.
CHARLES P. COUGHLAN
BY
Pearson + Pearson
ATTORNEYS

Dec. 27, 1966   C. P. COUGHLAN   3,294,157
REVERSE CYCLE HEAT PUMP
Filed July 21, 1964   3 Sheets-Sheet 2

INVENTOR.
CHARLES P. COUGHLAN
BY
Pearson + Pearson
ATTORNEYS

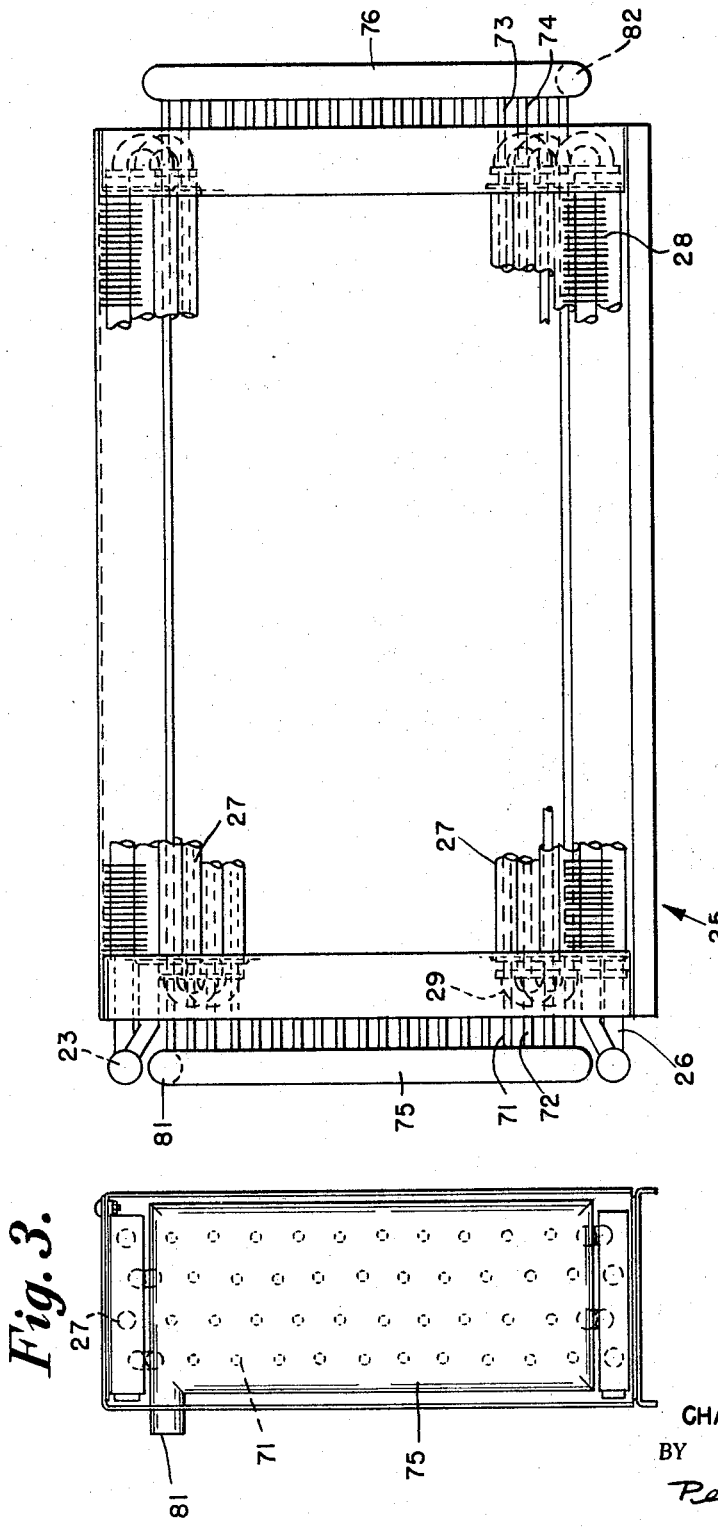

United States Patent Office 3,294,157
Patented Dec. 27, 1966

3,294,157
REVERSE CYCLE HEAT PUMP
Charles P. Coughlan, Old Mont Vernon Road,
Mont Vernon, N.H. 03057
Filed July 21, 1964, Ser. No. 384,142
9 Claims. (Cl. 165—29)

This invention relates to apparatus which utilizes waste heat of the internal combustion engine driving the compressor of a reverse cycle heat pump, to heat the interior of a building or the like.

It has heretofore been proposed to so utilize waste heat for example in U.S. Patent 2,130,606 to Wanamaker of September 20, 1938, U.S. Patent 2,242,588 to McGrath of May 20, 1941, U.S. Patent 2,257,915 to Newton of October 7, 1941, U.S. Patent 2,260,477 to Newton of October 28, 1941, U.S. Patent 2,266,238 to Newton of December 16, 1941, U.S. Patent 3,063,251 to Bochmer of November 13, 1962.

However, the devices of the prior art have usually placed the internal combustion engine within the building, with exhaust vents to the outside atmosphere, thus exposing the occupants of the building to possible leakage of noxious and toxic exhaust fumes. Most of these patents teach the mounting of one of the evaporator condenser coils of the refrigerant system outside the building to exchange heat with the ambient atmosphere. Most of the devices of these patents not only mount the engine in the building but pass the exhaust gases from the engine through conduits and heat exchangers within the building, thereby increasing the possibility of leakage. Where engine liquid jacket heat is used to heat the building, it is usually used to heat a separate boiler, coil or radiator directly from the heated liquid in the engine jacket.

It is the principal object of this invention to provide a reverse cycle, heat pump driven by an internal combustion engine for heating a building wherein the building need have no chimney, or engine exhaust vents. The engine and its exhaust gases are housed outside the living space of the building and waste heat from the engine liquid jacket flows in intimate contact with the refrigerant gas tubes to directly heat the gas in the system rather than directly heating the building.

Another object of the invention is to provide a reverse cycle heat pump in which the heat of the engine is automatically transferred from a plurality of manifolded, independent, individual tubes, each carrying hot liquid to the refrigerant gas in one of the coils for highly efficient winter heating of a building, but dissipated into the atmosphere outside the building during summer months.

A further object of the invention is to provide in a heating and cooling system, a novel evaporator-condenser coil, of sinuous, serpentine configuration, there being straight, liquid carrying pipes, concentrically within the gas tubes of the coil, connected to end manifolds so that all gas tubes of the coil are subject to substantially equal heat from the pipes.

Still another object of the invention is to not only provide a critical charge of refrigerant gas in a reverse cycle heat pump system, but to provide a predetermined amount of surface radiation within one of the coils of the system to equalize the input and output of B.t.u.'s to the portion of the charge in the coil when waste heat is heating the coil.

A still further object of the invention is to provide a separate housing outside a building for the internal combustion engine of a heat pump system and to supply low pressure natural gas to the engine from replaceable tanks outside the housing, thereby increasing the number of B.t.u.'s available, reducing the volume of the fuel, making the device usable in remote bottle gas areas and eliminating all heat exchange apparatus, except a sealed refrigerant gas coil, from the inside of the building to be heated.

Other objects and advantages of the invention will be apparent from the claims, the description of the drawings and from the drawings which illustrate a preferred embodiment.

FIGURE 3 is an enlarged fragmentary front view of the liquid heated gas coil, and FIGURE 4 is an end view of the coil shown in FIGURE 3.

Figure 1:
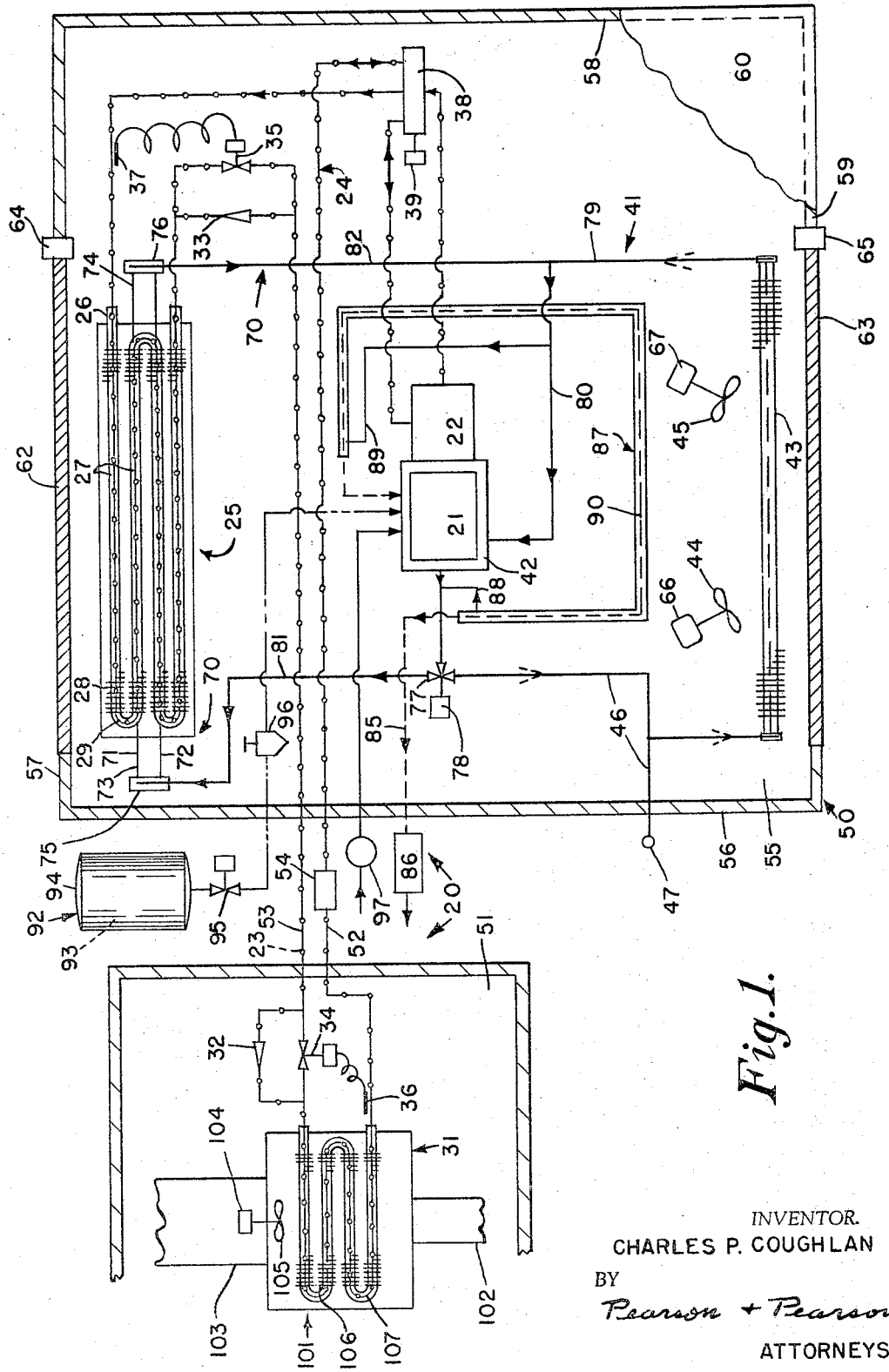
FIGURE 1 is a diagrammatic plan view of a reverse cycle heat pump constructed in accordance with the invention.
Figure 2:
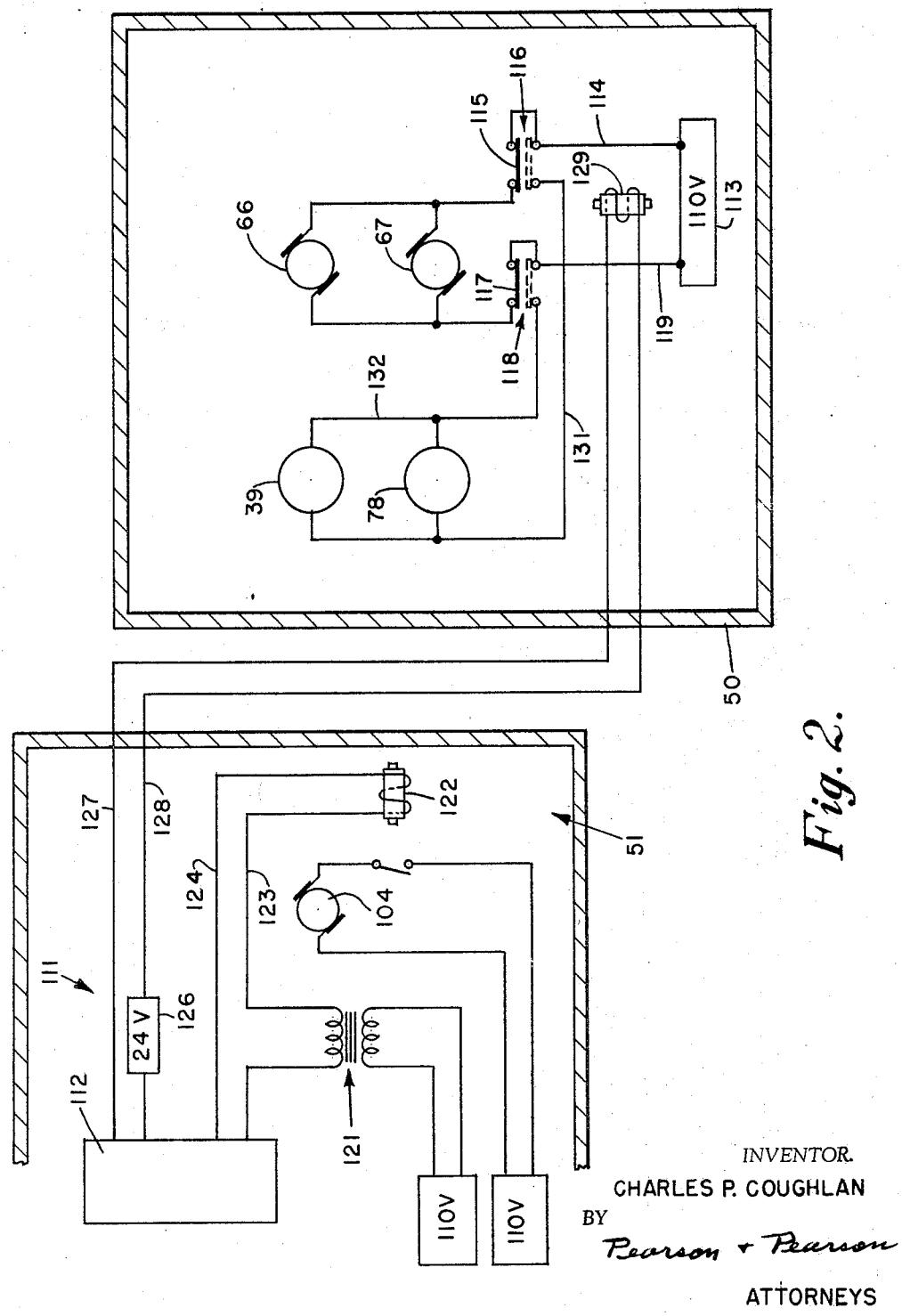
FIGURE 2 is a circuit diagram of the control system of the apparatus.

As shown in FIGURE 1 the reverse cycle heat pump 20 of the invention includes an internal combustion engine 21 which drives a compressor 22 for compressing the refrigerant gas 23 in the heating and cooling system. The circulation of the refrigerant gas 23 is depicted by solid lines with spaced circles therealong. The closed refrigerant gas system 24 includes the first evaporator-condenser coil 25 formed by the sinuous gas tube 26 having straight portions 27 with fins 28 and U shaped bends 29 at each opposite end. Refrigerant gas system 24 also includes a second evaporator-condenser coil 31, preferably of serpentine configuration similar to coil 25, the conventional check valves 32 and 33, thermo valves 34 and 35, actuated by bulbs 36 and 37 and the three way valve 38, the latter being preferably a ¾ changeover valve with three way pilot operated by a solenoid 39 and of the type manufactured by Ranco, Inc. of Columbus, Ohio, or type 4W 86–79 series of Alco Valve Co., St. Louis, Missouri.

The internal combustion engine 21 is provided with a liquid cooling system 41, including the liquid jacket 42, radiator 43, fans 44 and 45, and liquid piping 46 for supplying water to the engine cooling system from the water fill cap 47. The liquid pipe lines 46 are shown in full lines in FIGURE 1 to distinguish from the refrigerant gas tubing and other fluid lines. As thus far described, the apparatus is conventional and in the prior art might be mounted inside a building to be heated with a heat exchange unit, connected directly into the engine cooling system, and also mounted in the building to utilize waste heat.

However, in this invention, the heat pump 20 and engine 21 are enclosed in a heat-sealable housing 50, which is outside of and preferably remote from the building 51, for example ten or more feet away, but the refrigerant gas coil 31 of the system is mounted within the inhabited space 51 of the building. Preferably also the check valve 32, thermo valve 34 and bulb 36 associated with coil 31 are also in space 51. Supply and return refrigerant-gas conduits 52 and 53, connect coil 31 into the reverse cycle heat pump system, and are heat insulated as at 54, by any suitable insulation material, to avoid dissipation of heat during the winter months. Conduits 52 and 53 are preferably underground although the housing 50 may be on the roof of a high rise building with the supply and return conduits either inside or outside of the building.

The housing 50 includes a bottom 55, upstanding side walls 56, 57, 58 and 59 and a hinge pivoted top 60, all having suitable heat insulation therein to form a heat sealed enclosure. Sealing means in the form of a shutter, or louver, assembly 62 and 63 is provided, each in an opposite side wall 57 or 59 and actuated by an electric motor 64 or 65 so that the housing can be automatically tightly sealed to build up a concentration of engine heat therewithin or can be automatically unsealed to open the housing to the atmosphere. Preferably housing 50 is formed of metal sheets, such as stainless steel, insulated with fibre glass and having sponge rubber cover seals.

For example, the housing illustrated is about 45 x 55 inches and 26 inches high to accommodate a five ton compressor driven by an NA-62 engine of Continental Motor Corp., Muskegon, Michigan. The radiator shutter control motors 64 and 65 may be of the Modutrol type made by Honeywell Corp. of Minneapolis, Minnesota. The fans 44 and 45 are each driven by an electric motor 66 or 67 rather than by the engine crank shaft.

The hot liquid piping system 70 of the invention includes a plurality of individual, independent stretches such as 71 and 72, each closely associated with a gas refrigerant tube 27 of the coil 25, the hot liquid in said stretches being in heat conductive juxtaposition and contact with the refrigerant gas in said tubes for directly transferring heat to the gas 23 in the coil. Preferably each stretch 71 or 72 is a straight copper water pipe mounted in holes drilled in the bent end portions 29 of the gas tubes of the coil, silver brazed in sealed position and extending concentrically and coaxially through the full length of the corresponding straight gas tube 27 with projecting ends 73 and 74 each sealed into a manifold 75 or 76. A predetermined critical charge of refrigerant gas 23, is placed in the reverse cycle gas system 24, depending on the length of the conduits 52 and 53 in a particular installation, and the dimensions of the tubes of coil 25 are predetermined to compensate for the space occupied therein by the stretches 71 and 72 so that the input and output of B.t.u.'s and the volumetric capacity of coils 25 and 31 will be equalized and the coils 25 and 31 will operate efficiently when on summer cooling cycle. In the embodiment illustrated the gas tubes of coil 25 are one inch outside diameter with four rows of twelve tubes, totalling forty-eight tubes, while there are forty liquid tubes such as 71 and 72 each of three eighths inches outside diameter and coil 31 is about one third smaller in dimensions than coil 25 so that coils 25 and 31 will each pass about 2000 cubic feet per minute of gas 23.

The hot liquid piping systems 41 and 70, which contain water with a suitable anti-freeze, also include the three way valve 77 actuated by a solenoid 78 for directing hot liquid from the engine 21 either through the engine cooling system 41 or through the centre of the tubes 27 of coil 25 to heat building 51, as required. When valve 77 is open to the engine cooling system 41, the system operates in the usual manner to cool the engine, by being pumped through the conduit 46 through radiator 43, through conduit 79 and 80 back into the jacket, the fans 44 and 45 cooling the liquid in the radiator. When valve 77 is open to the coil 25, the hot liquid is pumped through conduit 81 into manifold 75 thence through the stretches 71 or 72 in the coil 25, to transfer heat to the gas 23 therein, and then through manifold 76 to return through conduit 82 and conduit 80 back to the engine jacket 42.

The maximum ambient temperature around the unjacketed portions of the engine is kept at about 90° F. while the liquid moving from the jacket through the piping system 70 may be at about 180° F., the rotation or non rotation of the fans 44 and 45, and the open or closed position of the shutter assemblies 62 and 63, determining the heat of the liquid during operation.

It should also be noted that when the housing is sealed, the heat concentrated therein directly affects the fins 28, and the exterior of the gas tubes of coil 25, to supplement the interior heat transfer to the gas by also heating the exterior of the coil 25.

Preferably also the engine exhaust pipe 85, leading from engine 21 to a muffler 86 outside the housing 50, is provided with a liquid jacket 87, the opposite ends of the jacket 87 being connected by liquid conduits 88 and 89 into the liquid cooling system 41 of the engine. Heated liquid from the exhaust jacket thus is drawn from the jacket 87 along with heated liquid pumped from the engine jacket to supplement the heat of the engine in heating the liquid 90 in the system, thereby increasing efficiency. The exhaust gas is shown in broken lines with a single short dash.

The fuel supply 92 for the engine 21 can be gasoline, or diesel oil, but preferably it is low pressure natural gas 93, shown in broken lines with two dashes. The gas 93 is supplied from the replaceable container 94, of the bottle gas type, through the safety solenoid valve 95 and pressure regulating valve 96 the latter reducing pressure to about 3 p.s.i. The use of this fuel permits the device to be used in remote rural areas and the gas produces considerably more B.t.u.'s than other fuels of equivalent weight and volume. The carburetor intake 97 and the L.P. gas container 94 are both mounted outside housing 50.

Coil 31 requires no chimney or other vents in the building 51 and may be used as a heat exchanger, for example by serving as the cooling and heating unit of a central hot air heating system 101.

As shown, the air supply ducts such as 102 lead to outlets in various rooms of the building and the return ducts such as 103 lead back to the coil 31, which is preferably suspended from the ceiling of the cellar in any convenient, well known manner. An electric motor 104 and fan 105 drive the air through the fins 106 and gas tubes 107 of the coil to heat or cool the circulated air.

In exemplary operation as a reverse-cycle heat pump, air drawn through the return duct at 90° F. is blown by fan 105 through coil 31, the refrigerant therein being at 36° F. so that air at about 60° F. is fed to supply duct 102 to cool building 51. The fluid returning to the compressor is thus at about 90° F. having condensed to a hot liquid. The louvers of housing 50 are open and fans 44 and 45 are in operation so that coil 25, acting as a condenser, transfers the heat to the atmosphere, reducing the temperature of the refrigerant back to 36° F.

In the winter, the reverse-cycle heat pump of the invention serves to heat the refrigerant in coil 31 to about 160° F. so that air returned through duct 103 at 60° is suppled to duct 102 at a higher temperature of 70°–85° F. The refrigerant is heated in coil 25 to about 180° F. by the hot liquid from the engine jacket, by hot liquid from the exhaust jacket and by the ambient heat within the housing 50, since the louvers are closed and the fans not in operation.

The electric control circuit of the heat pump 20, when operating conventionally is well known and therefore not described in detail. However, in this invention additional control means 111 is provided. The shutter assemblies 62 and 63 are spring loaded into closed position, the actuators 64 and 65 controlling the opening of the shutters, independently of signal from the temperature sensitive means 112 in building 51 and entirely dependent on the variations in temperature within housing 50. Thus the shutters are opened by the "Modultrols" 64 and 65, for example when temperature within the housing 50 is 90° F. and are permitted to spring close when temperature within housing 50 is reduced to about 35° F. or when electricity is cut off.

In the air conditioning cycle the motors 64 and 65 of the radiator fans are energized from a suitable source 113 through conductors 114, armature 115 of relay 116, motors 64 and 65, armature 117 of relay 118 and conductor 119. The reverse-cycle solenoid 39 maintains the three way valve 38 in its usual reverse-cycle air conditioning position and the solenoid 78 maintains the liquid valve 77 in the engine cooling position.

The thermo switch 112 controls the motor 104 and fan 105 by the 24 volt circuit which includes transformer 121, and relay 122 and conductors 123 and 124, in the usual manner.

When heat is demanded by the temperature sensitive means 112, it closes a circuit including a 24 volt source 126, conductors 127 and 128 and relay coil 129 thereby moving the armatures 115 and 117 to the dotted line position shown. Armature 115 opens the circuit to the fan motors 64 and 65 and armature 117 closes a circuit to the reverse-cycle valve solenoid 39 and to the liquid valve solenoid 78, thereby shifting both valves to the winter heating cycle. This circuit comprises the source 113, conductor 114, armature 115, conductor 131, solenoids 78 and 39, conductor 132, armature 117 and conductor 119 back to source 113.

Upon signal from the device 112 that the building 51 has received sufficient heat, the 24 volt circuit to relay 129 is opened permitting the armatures 115 and 117 to resume their original positions.

For convenience of description the above circuit has been much simplified, it being understood that the circuitry of a reverse-cycle heat pump is well known as is the automatic sensing of temperatures in a building and automatic response to maintain a desired range of temperatures therein.

I claim:

1. In a reverse-cycle heating and cooling system for the space within a building, said system being of the type having a compressor driven by a liquid-cooled, liquid jacketed internal-combustion engine and having means to reverse the flow of refrigerant in said system, the combination of:
    a heat-insulated, heat-sealable housing mounted outside said building and enclosing substantially all of said system including said engine and a first evaporator-condenser coil of said system;
    a second evaporator-condenser coil of said system mounted in said space within said building and connected by heat insulated conduits into the system in said housing;
    a predetermined charge of refrigerant gas in the compressor, conduit, valves and coils of said system for causing the same to function as a conventional reverse-cycle heat pump;
    a hot liquid piping system within said housing, supplied from the liquid jacket of said liquid-cooled engine and having a plurality of individual, independent stretches each closely, concentrically and coaxially associated with the tubes of said first evaporator-condenser coil, the hot liquid in said stretches being in heat conductive juxtaposition and contact with the refrigerant in said tubes for directly transferring heat from the engine thereto;
    valve means in said hot liquid piping system for selectively opening said system to said coil;
    temperature sensing means within said building, and
    means responsive to said temperature-sensing means controlling the time and temperature of operation of said engine in accordance with variations in temperature in said space and controlling the operation of said valve means.

2. A system as specified in claim 1 wherein:
    the fuel supply for said engine comprises a replaceable tank, containing low pressure natural gas, mounted outside said housing and a fuel conduit connecting said tank to the carburator of said engine.

3. A system as specified in claim 1 wherein:
    said stretches of said hot liquid piping system, which are closely associated with the tubes of said first evaporator-condenser coil, have a predetermined area of heat radiation surface with relation to the volume of refrigerant gas in the tubes of said coil such as to substantially equalize the input and output of B.t.u.'s to said gas.

4. A system as specified in claim 1 wherein:
    said stretches of said hot liquid piping system are straight tubes coaxially and concentrically mounted within corresponding, straight stretches of the refrigerant gas tubes of said first coil, and said tubes are of predetermined dimensions to equalize the heat exchange relationship of the fluids flowing therein.

5. A system as specified in claim 1 wherein:
    the stretches of said hot liquid piping system are straight tubes of predetermined diameter coaxially and concentrically mounted within corresponding straight stretches of said coil, each opposite end of each said straight tube projecting from a bend at each opposite end of one of said coil stretches, and
    a pair of manifolds, each connecting with all of the adjacent projecting ends of said liquid tubes;
    whereby heat from the hot liquid of said engine is substantially instantaneously transferred to the gas in each stretch of said coil.

6. A system as specified in claim 1 plus:
    shutter means in a side wall of said housing and mechanism for opening and closing the same, in response to predetermined temperatures within said housing;
    whereby ambient heat generated by said engine within said housing may be retained to heat the outside of the evaporator-condenser coil within said housing.

7. A system as specified in claim 1 plus:
    temperature sensing means mounted within said housing, and
    means, responsive to said temperature sensing means, for sealing and unsealing said housing to control the ambient temperature therewithin.

8. A system as specified in claim 1 plus:
    a heat insulated liquid jacket extending around the engine exhaust pipes within said housing, and conduit means connecting said jacket to the liquid jacket of said engine;
    whereby waste heat in the exhaust of said engine is recovered and transferred to the liquid in said hot liquid piping system.

9. In a system for heating and cooling an enclosed, human inhabited space, the combination of:
    a heat-insulated, heat-sealable housing mounted outside said space;
    a liquid cooled, internal-combustion engine driven reverse-cycle refrigerating unit, including a liquid jacket on said engine, means to reverse the flow of refrigerant in said unit and a first evaporator-condenser coil, mounted within said housing;
    at least a second evaporator-condenser coil mounted within said space to serve as a heat exchanger therein;
    sealed refrigerant gas conduits connecting said second coil into said unit in said housing;
    a liquid piping system including the liquid jacket of said engine, manifolds at each end of said first coil and a plurality of straight, individual, independent liquid tubes extending between said manifolds, each sealably mounted concentrically within a gas tube of said coil for exchanging heat therewith;
    valve means in said liquid piping system for selectively opening said system to said coil;
    shutter means for sealing and unsealing said housing, and
    temperature responsive means in said space and in said housing controlling the operation of said engine, the valve means of said system and said shutter means in accordance with variations of temperature therein.

References Cited by the Examiner

UNITED STATES PATENTS 2,263,476  11/1941  Sunday _____ 165—29 X
2,922,290  1/1960  Carraway _____ 165—43 X
3,157,227  11/1964  Palmer _____ 165—29

ROBERT A. O'LEARY, *Primary Examiner.*

M. A. ANTONAKAS, *Assistant Examiner.*